United States Patent Office
3,226,214
Patented Dec. 28, 1965

3,226,214
EPOXY RESIN ABRASIVE STRUCTURES AND METHOD THEREFOR
Rupert S. Daniels, Union, and Bruce P. Barth, Bound Brook, N.J., assignors to Union Carbide Corporation, a corporation of New York
No Drawing. Filed Nov. 3, 1960, Ser. No. 66,945
17 Claims. (Cl. 51—298)

This invention relates to abrasives structures comprising abrasive grains and a novel abrasive binder. More particularly, the invention relates to abrasive structures bonded with an abrasive binder providing superior flexural strength particularly at high temperatures and method for making such abrasive articles.

In general, abrasive structures such as grinding wheels are produced by wetting abrasive grains with a liquid thermosetting composition, mixing the so-wetted grains with a powdered thermosetting composition and suitable fillers to form a dry, pourable mix, molding the mass and curing the resin binder.

Heretofore, the nearly exclusively used thermosetting compositions have been phenolic resins, e.g., phenolformaldehyde resins. These resins as abrasive binders could be improved upon in two important respects. Firstly, during cure of these phenolic resins, volatiles are released causing voids in the abrasive structure and consequent porosity and lowered density in the abrasive structure. Higher abrasive structure density is generally associated with greater abrading efficiency; hence, release of volatiles by conventional phenolic resin binders has a direct and adverse effect on abrasive structure performance. Secondly, greater strength than phenolic resins presently provide particularly at elevated operating temperatures would also increase abrading efficiency and hence is desirable.

We have now discovered, in accordance with the present invention, that abrasive structures having superior flexural strength and particularly high temperature flexural strength are produced by first coating abrasive grains with a liquid, curable epoxy resin of a polycarboxylic acid anhydride, and a member selected from the group consisting of bis(2,3-epoxycyclopentyl)ether, 4-vinylcyclohexene dioxide and dicyclopentadiene dioxide, mixing the wetted grains with a curable, grindable epoxy resin of a polycarboxylic acid anhydride, and dicyclopentadiene dioxide and molding and heating the mixture until cured.

It is preferred to include a polyol in the binder resin preparation to make the resinification reaction smoother and more easily controlled.

The resulting preferred abrasive structures comprise abrasive grains bonded with the curing reaction product of a polycarboxylic acid anhydride, a polyol and dicyclopentadiene dioxide and the curing reaction product of a polycarboxylic acid anhydride, a polyol and one or more of bis(2,3-epoxycyclopentyl)ether, 4-vinylcyclohexene dioxide and dicyclopentadiene dioxide. Abrasive structures bonded with the binders of the present invention are superior in high temperature performance to both heretofore known epoxy resin bonded abrasive structures and phenolic resin abrasive structures.

Dicyclopentadiene dioxide is a solid diepoxide having a melting point of about 184° C. This diepoxide can be illustrated by the formula:

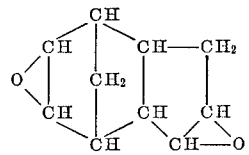

The diepoxide can be prepared by the epoxidation of the olefinic double bonds of dicyclopentadiene employing suitable epoxidizing agents.

Bis(2,3-epoxycyclopentyl) ether is a liquid diepoxy dicyclic aliphatic ether having a viscosity of about 28 centipoises at 27° C. The preparation of this diepoxide involves what can be termed epoxidation, or the controlled oxidation of the double bonds of bis(2-cyclopentenyl) ether which, itself, can be made from cyclopentadiene by the successive steps of hydrochlorination and alkaline hydrolysis. More specifically, bis(2-cyclopentenyl) ether can be prepared from the reaction of cyclopentadiene with hydrogen chloride in a suitable solvent, such as benzene, or without a solvent, for a period of about one hour at a low temperature, such as 0° C. to −15° C., thereby forming 1-chloro-2-cyclopentene. Subsequently, 1-chloro-2-cyclopentene can be subjected to alkaline hydrolysis with an aqueous solution of sodium carbonate or sodium hydroxide at a temperature of the order of 40° C. to 60° C. to form bis(2-cyclopentenyl) ether. A substantially pure bis(2-cyclopentenyl) ether then can be obtained by any suitable separation procedure, for example, fractional distillation.

Suitable epoxidizing agents for the epoxidation reactions include peracetic acid and acetaldehyde monoperacetate. The epoxidation reaction can be advantageously carried out by charging dicyclopentadiene or bis(2-cyclopentenyl) ether to a reaction vessel and then gradually adding the epoxidizing agent. In order to provide ease of handling and to avoid the formation of highly concentrated or crystalline peracetic acid with its attendant explosion hazard, the epoxidizing agent preferably is employed in a solvent, as for example acetone, chloroform, methyl-ethyl ketone, ethyl acetate, butyl acetate, and the like. The reaction can be carried out at a temperature within the range of about −25° C. to 150° C., although lower and higher temperatures may be used. However, longer reaction times are needed at the lower temperatures to produce high yields. At the higher temperatures, side reactions form undesirable materials which can be removed, however, by conventional purificaton procedures, such as fractional distillation. The reaction is continued until an analysis for epoxidizing agent indicates that an amount at least sufficient to epoxidize all the double bonds of the dicyclopentadiene or bis(2-cyclopentenyl) ether has been consumed. In this connection it is desirable to employ an excess over the theoretical amount of peracetic acid to assure complete epoxidation. Upon discontinuance of the reaction, side-reaction products, solvent and unreacted material are removed by any convenient procedure, such as, by adding a potboiler, e.g., ethylbenzene, and stripping low boiling materials. A solid material, identified as dicyclopentadiene dioxide or a liquid material, identified as bis(2,3-epoxycyclopentyl) ether, is obtained. Dicyclopentadiene dioxide or bis(2,3-epoxycyclopentyl) ether can be accepted as a residue product and subsequently further refined by distillation, extraction or crystallization, if desired. The bis(2,3-epoxycyclopentyl) ether product partially solidifies on standing at room temperature for 1 to 3 days which indicates the possible formation of a solid position isomer. This semi-solid bis (2,3-epoxycyclopentyl) ether can be liquified by melting at a temperature of 30° C. to 35° C. and will remain a liquid for a period of several days at room temperatures.

The epoxide component, 4-vinylcyclohexene dioxide, i.e., 3-epoxyethyl-7-oxabicyclo[4.1.0] heptane characterized by the formula

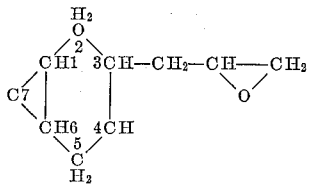

is not a new compound. One preferred method of preparing 4-vinylcyclohexene dioxide is the reaction of 4-vinylcyclohexene with an excess of peracetic acid solution in an inert solvent such as acetone or ethyl acetate at approximately 70° C., followed by isolation of the diepoxide product by fractional distillation. The dioxide also can be prepared by treating 4-vinylcyclohexene monoxide with peracetic acid under approximately the same conditions. Other modes of preparing 4-vinylcyclohexene dioxide are more fully described in U.S. Patent 2,539,341.

By the term "polyol," as used herein, is meant an organic compound having at least two hydroxyl groups which are alcoholic hydroxyl groups, phenolic hydroxyl groups or both alcoholic and phenolic hydroxyl groups. Typical polyols can be represented by the general formula:

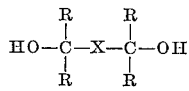

wherein R can be an alkyl group or hydrogen and can be the same or different for all R's in the molecule. X can be a single bond or a divalent group composed of a carbon atom or group of carbon atoms interconnected by single or multiple bonds and to which such groups as hydrogen, alkyl, hydroxyl, carboxyl, amino, cyclic groups and the like or combinations thereof can be attached. X can also represent such divalent groups as oxyalkylene or polyoxyalkylene groups. X, as a divalent group may also contain nitrogen to which other groups, for example, hydrogen, alkyl, alkanol and the like may be attached or it may represent a carbon atom group which contains sulfur. It can also represent cyclic groups, such as phenylene, cyclohexylene and the like. The R's and X together with the carbon atoms, i.e., the C's of the formula, can represent a cyclic group such as phenylene, cyclohexylene and the like. The presence of other groups, with the exception of tautomeric enolic groups, not specifically listed herein and not participating in the curing reaction is by no means harmful and, in fact, can be useful in developing special properties in these resins. Mixtures of polyols or only one polyol can be employed in these curable compositions.

Representative polyols which can be employed in these compositions are polyhydric alcohols, such as ethylene glycol, diethylene glycol, polyethylene glycols, propylene glycol, tripropylene glycol, polypropylene gycols, polyethylenepoly-propylene glycols, trimethylene glycol, butanediols, pentanediols, 2-ethyl-1,3-hexanediol, 2-methyl-2,4-pentanediol, 12,13-tetracosanediol, 2-butene-1,4-diol, 2-methoxymethyl-2,4-dimethyl-1,5-pentanediol, diethanolamine, triethanolamine, glycerol, polyglycerols, pentaerythritol, sorbitol, polyvinyl alcohols, cyclohexanediols, cyclopentanediols, inositol, trimethylolphenol, 2,4,6-tri- methylolphenyl allyl ether, and polyhydric phenols, such as dihydroxytoluenes, resorcinol, 2,2-bis(4-hydroxyphenyl) propane, bis(4-hydroxyphenyl) methane, the polyhydric phenolic-formaldehyde condensation products, and the like. Polyols which are free of acetylenic unsaturation and composed of carbon, hydrogen and oxygen combined as hydroxyl oxygen or ether oxygen connecting two otherwise unconnected carbon atoms and having not more than 24 carbon atoms are preferred.

Polycarboxylic acid anhydrides useful in producing the curable binder resins can be represented by the formula:

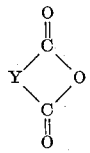

wherein Y represents two or more carbon atoms interconnected by single or double bonds and to which such groups as hydrogen, alkyl, hydroxyl, nitro, chloro, iodo, bromo, cyclic groups and the like or combinations thereof may be attached. Y can also represent groups containing carbon atoms interconnected by single or double bonds and oxydicarboxyl groups, i.e.,

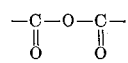

interconnecting the carbon atom groups to which such other groups as previously mentioned may be attached. Y may also represent such cyclic groups as phenylene, cyclohexylene, cyclohexenylene, and the like which may have one or more oxydicarbonyl groups attached thereto. Polycarboxylic acid anhydrides, containing other groups not specifically mentioned herein, and not taking part in the curing reaction can be used in these curable compositions without harmful effects, and, in fact, can be used to develop particular properties in the resins. One polycarboxylic acid anhydride or a mixture of two or more, as desired, can be used in the curable compositions. Typical polycarboxylic acid anhydrides include succinic anhydride, glutaric anhydride, propylsuccinic anhydride, methylbutyl succinic anhydride, hexylsuccinic anhydride, heptylsuccinic anhydride, pentenylsuccinic anhydride, octenylsuccinic anhydride, nonenylsuccinic anhydride, alpha, beta-diethylsuccinic anhydride, maleic anhydride, chloromaleic anhydride, dichloromaleic anhydride, itaconic anhydride, citraconic anhydride, hexahydrophthalic anhydride, hexachlorophthalic anhydride, tetrahydrophthalic anhydride, methyltetrahydrophthalic anhydride, tetrachloropthalic anhydride, hexachloroendomethylenetetrahydrophthalic anhydride, hereinafter referred to as chlorendic hydride, tetrabromophthalic anhydride, tetraiodophthalic anhydride, phthalic anhydride, 4-nitrophthalic anhydride, 1,2-naphthalic anhydride, 1,8-naphthalic anhydride, 2,3-naphthalic anhydride, 1,2,4,5-benzenetetracarboxylic dianhydride, polymeric dicarboxylic acid anhydrides, or mixed polymeric dicarboxylic acid anhydrides, such as those prepared by the autocondensation of dicarboxylic acids, for example, adipic acid, pimelic acid, sebacic acid, hexahydroisophthalic acid, terephthalic acid, isophthalic acid, and the like. Also, other dicarboxylic acid anhydrides, useful in these curable compositions include the Diels-Alder adducts of maleic acid and aliphatic compounds having conjugated double bonds, e.g., styrene maleic anhydride copolymers. Also endomethylene tetrahydrophthalic anhydride is suitable. Preferred polycarboxylic acid anhydrides are those which are soluble in dicyclopentadiene dioxide, bis(2,3-epoxycyclopentyl)ether and 4-vinylcyclohexene dioxide at temperatures below about 250° C.

Also, as polycarboxylic acids useful in the curable compositions there are included compounds containing ester groups in addition to two or more carboxy groups and which can be aptly termed polycarboxy polyesters of polycarboxylic acids, such as those listed above, or the corresponding anhydrides of said acids, esterified with polyhydric alcohols. Stated in other words, by the term "polycarboxy polyesters," as used herein, is meant polyesters containing two or more carboxy groups per molecule. These polycarboxy polyesters can be prepared by known condensation procedures, employing mole ratios favoring greater than equivalent amounts of polycarboxylic acid, or anhydride. More specifically, the amount of polycarboxylic acid, or anhydride, employed in the esterification reaction should contain more carboxy groups than are required to react with the hydroxyl groups of the amount of polyhydric reactant. Polyhydric alcohols which can be employed in preparing these polycarboxyl polyesters include dihydric alcohols, such as ethylene glycol, diethylene glycol, triethylene glycol, tetraethylene glycol, 1,2-propylene glycol, 1,3-propylene glycol, dipropylene glycols, tripropylene glycols, polyoxyethylene glycols, polyoxypropylene glycols, 1,2-butylene glycol, 1,4-butylene glycol, pentane-1,5-diol, pentane-2,4-diol, 2,2-dimethyltrimethylene glycol, hexane-1,4-diol, hexane-1,5-diol, hexane-1,6 - diol, hexane - 2,5 - diol, 3-methylpentane-1,5-diol, 2-methylpentane-2,5-diol, 3-methylpentane-2,5-diol, 2,2-diethylpropane-1,3-diol, 2,2-diethylhexane-1,3-diol, 2,5-dimethylhexane-2,5-diol, octadecane-1,12-diol, 1-butene-3,4 - diol, 2 - butene - 1,4-diol, 2-butyne-1,4-diol, 2,5-dimethyl-3-hexyne-2,5-diol and the like; trihydric alcohols such as glycerol, trimethylolmethane, hexane-1,2,6-triol, 1,1,1-trimethylolpropane, and the like; tetrahydric compounds, such as pentaerythritol, diglycerol, and the like; and higher polyhydric compounds such as pentaglycerol, dipentaerythritol, polyvinyl alcohols and the like. Additional polyhydric alcohols useful in making polycarboxy polyesters can be prepared by the reaction of epoxides, e.g., diglycidyl ethers of 2,2-propane bisphenol, and reactive hydrogen-containing organic compounds, e.g., amines, polycarboxylic acids, polyhydric compounds and the like. In forming the polycarboxy polyesters that can be employed in the compositions of this invention it is preferable to use a dihydric, trihydric or tetrahydric aliphatic or oxaaliphatic alcohol.

The mole ratios in which the polycarboxylic acid anhydride can be reacted with polyhydric alcohols in preparing polycarboxylic polyesters useful in our compositions are those which provide polyesters having more than one carboxy group per molecule. In the case of trifunctional and tetrafunctional reactants in the esterification reaction, the mole ratios of the respective reactants must be such as to avert gelation. The preferred mole ratio ranges of dicarboxylic acid or anhydride to trihydric or tetrahydric alcohols that have been found to provide polycarboxylic polyesters which can be advantageously used in the compositions of this invention are presented in Table I.

TABLE I

| Polyhydric alcohol: | Mole ratio of dicarboxylic acid or anhydride to polyhydric alcohol |
|---|---|
| Trihydric alcohol | 2.2 to 3.0 |
| Tetrahydric alcohol | 3.0 to 4.0 |

It is preferred, however, to employ polycarboxylic polyesters prepared from dicarboxylic acids or anhydrides and polyhydric alcohols in the mole ratios specified in Table II.

TABLE II

| Polyhydric alcohol: | Mole ratio of dicarboxylic acid or anhydride to polyhydric alcohol |
|---|---|
| Trihydric alcohol | 2.5 to 3.0 |
| Tetrahydric alcohol | 3.5 to 4.0 |

These polycarboxy polyesters can be obtained by condensing, in accordance with known procedures, a polyhydric alcohol and a polycarboxylic acid or anhydride. This condensation reaction may be conducted, for example, by heating the reactants to a temperature within the range from 100° C. to 200° C. with or without an acidic catalyst. Water formed by the condensation reaction may be removed by distillation. The course of the reaction may be followed by making acid number determinations and the reaction can be stopped when a suitable polycarboxy polyester has been obtained.

The solid, grindable epoxy resin and the liquid epoxy resin which together comprise the abrasive binder of the present invention are prepared in basically the same way.

The epoxy, whether it be 4-vinylcyclohexane dioxide, dicyclopentadiene dioxide or bis(2,3-epoxycyclopentyl) ether, is mixed with a polycarboxylic acid anhydride and in a preferred method of preparing these resins with a polyol. Preferably the mixing is carried out at a temperature above the melting point of the highest melting component. Homogeneous compositions with liquid polyols and solid polycarboxylic acid anhydrides can be advantageously obtained by heating the anhydride to at least its melting point and adding it to the epoxy and polyol which are heated to the melting temperature or above of the anhydride. Any other sequence of preparative steps which liquefies the anhydride or in the case of solid polyols, liquefies the polyol by heating the solid to a temperature above its melting point can be used. Stirring aids the formation of a homogeneous mixture. While not wishing to be held to any particular theory or mechanics of reaction, it is believed that in curing, some of the polyol reacts with some of the polycarboxylic acid anhydride to form a polyester which in turn reacts with dicyclopentadiene dioxide, 4-vinylcyclohexene dioxide or bis(2,3-epoxycyclopentyl) ester. A polycarboxy polyester, i.e., a polyester containing two or more carboxy groups, is believed to be formed when the composition contains amounts of polyol and anhydride which provide more carboxy equivalents than hydroxyl equivalents. By the term "carboxyl equivalents," as used herein, is meant the number of moles of carboxy groups, =COOH, which would be contained by an amount of the hydated anhydride. One mole of maleic anhydride is considered to have 2 carboxy equivalents, for example. By the term "hydroxyl equivalents," as used herein, is meant the number of moles of phenolic or alcoholic groups container by an amount of polyol. For example, one mole of glycerol contains 3 hydroxyl equivalents. One carboxyl group contained by the polycarboxyl polyester is believed to react with one epoxy group of dicyclopentadiene dioxide, 4-vinylcyclohexene dioxide, or bis(2,3-epoxycyclopentyl) ether to form an ester linkage interconnecting the polyester molecule and the epoxy molecule and a hydroxyl group connected to the ether molecule. This reaction can be typified by the general equation:

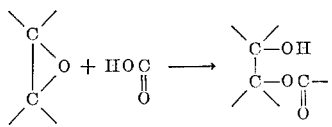

wherein

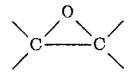

is an epoxy group of dicyclopentadiene dioxide, 4-vinyl-cyclohexene, or bis(2,3-epoxycyclopentyl) ether and

is a carboxy group of the polycarboxy polyester. When these curable compositions contain such amounts of anhydride and polyols as provide more hydroxyl equivalents than carboxy equivalents, polyhydric polyesters, i.e., polyesters containing two or more alcoholic or phenolic hydroxyl groups, are believed to be formed. One hydroxyl group of the polyhydric polyester is believed to be capable of reacting with one epoxy group to form a carbon-to-oxygen-to-carbon linkage interconnecting the polyester molecule and the diepoxide or ether molecule and a hydroxyl group connected to said ether molecule. It is also thought that some of the polyol can also directly react through its hydroxyl groups with epoxy groups to form carbon-to-oxygen-to-carbon ether linkages linking polyol molecules with diepoxide or ether molecules and forming hydroxyl groups attached to said ether molecules in a manner similar to that described above. It is also believed that some polycarboxylic acid anhydride molecules will react with hydroxyl groups formed by the above-described reactions thereby forming ester linkages which can provide cross-linking. Some degree of cross-linking is believed to be brought about also by etherification of epoxy groups of different dicyclopentadiene dioxide, 4-vinylcyclohexene or bis(2,3-epoxycyclopentyl)ether molecules, such as may be represented by the general equation:

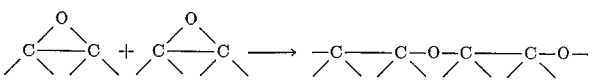

Grindable resins or liquid resins can be made from compositions which contain dicyclopentadiene dioxide and polycarboxylic acid anhydrides in such amounts as to provide about 0.16 to 5.0 and preferably about 1 carboxy equivalent of the anhydride for each epoxy equivalent of the diepoxide and polyols in such amounts as to provide up to about 2.0 hydroxyl groups of the polyol for each epoxy equivalent of the diepoxide. The time and temperature of reaction determine the viscosity of the resin product. Generally speaking, temperatures of from 125° to 250° C. are needed to cure the epoxy resin to a grindable state, whereas temperatures of less than 100° C. provide useful liquid curable resins.

By the term "epoxy equivalents," as used herein, is meant the number of epoxy groups,

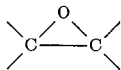

contained by an amount of dicyclopentadiene dioxide, bis(2,3-epoxycyclopentyl)ether or 4-vinylcyclohexene dioxide. For example, one mole of dicyclopentadiene dioxide, bis(2,3 - epoxycyclopentyl)ether or 4 - vinylcyclohexene dioxide contains two epoxy equivalents.

Liquid curable resins can be made from compositions which contain bis(2,3-epoxycyclopentyl)ether and polycarboxylic acid anhydrides in such amounts as provide about 0.33 to 4.00 carboxy equivalents of the anhydride for each epoxy equivalent of the ether. Harder infusible resins having high heat distortion values and which are also water-resistant and insoluble in most organic solvents also can be obtained from these curable compositions. For example, harder resins of this type can be made from curable compositions which contain bis(2,3-epoxycyclopentyl)ether, polycarboxylic acid anhydrides in such amounts as to provide 0.67 to 3.00 carboxy equivalents of the anhydride for each epoxy equivalent of bis(2,3-epoxycyclopentyl)ether and polyols in such amounts as to provide from 0.16 to 1.67 hydroxyl equivalents for each epoxy equivalent of bis(2,3-epoxycyclopentyl)ether.

Liquid curable resins can be made from compositions which contain 4-vinylcyclohexene dioxide and polycarboxylic acid anhydrides in such amounts as provide about 0.1 to 0.8 carboxy equivalent of the anhydride for each epoxy equivalent of the ether.

Curing of the above compositions can be carried out by maintaining the curable compositions at temperatures from 15° C. to 250° C. and preferably from 25° or 50° to 200° C. Temperatures higher than 250° C. can be used. The time for effecting a complete cure can be varied from several minutes to several hours.

Acidic and basic catalysts can be added, if desired, to speed the rate of cure. Catalysts in amounts ranging up to 5.0 weight percent based on the weight of epoxide can be added at any time prior to curing or not at all, as desired. Higher catalyst concentrations above this range are also effective, although concentrations of 5.0 weight percent and below have been found to be adequate. Catalyst concentrations of 0.001 to 5.0 weight percent based on the weight of epoxide are particularly preferred.

Catalysts which can be employed with advantageous effects in accelerating cure are the basic and acidic catalysts including strong alkalis, mineral acids and metal halide Lewis acids. Typical strong alkalis include the alkali metal hydroxides, e.g., sodium hydroxide and potassium hydroxide, and quaternary ammonium compounds, e.g., benzoyltrimethylammonium hydroxide, tetramethylammonium hydroxide and the like; and tertiaryamines, e.g., benzyldimethylamine, dimethylaminomethylphenol, 2,4,6-tris (dimethylaminoethyl) phenol and the like. Representative of mineral acids which can be used in speeding the formation of these resins are sulfuric acid, perchloric acid, polyphosphoric acid and the various sulfonic acids, such as toluene sulfonic acid, benzene sulfonic acid and the like. Metal halide Lewis acids which are also effective in speeding the cure of these resins include boron trifluoride, stannic chloride, zinc chloride, aluminum chloride, ferric chloride and the like. The metal halide Lewis acid catalysts can also be used in the form of such complexes as etherate complexes and amine complexes, for example, boron trifluoride-piperidine and boron trifluoride-monoethylamine complexes. In the form of a complex, the metal halide Lewis acid catalyst is believed to remain substantially inactive until released as by dissociation of the complex upon increasing the temperature. When released from the complex, the catalyst then exerts its catalytic effect.

Uniform dispersion of catalyst in the curable compositions prior to curing has been found to be desirable in order to obtain homogeneous resins and to minimize localized curing around catalyst particles. Agitation of the compositions containing catalyst is adequate when the catalyst is miscible with said compositions. When the two are immiscible, the catalyst can be added in a solvent. Typical solvents for the catalysts include organic ethers, e.g., diethyl ether, dipropyl ether, 2-methoxy-1-propanol, organic esters, e.g., methyl acetate, ethyl acetate, ethyl propionate, organic ketones, e.g., acetone, methylisobutylketone, cyclohexanone, organic alcohols, e.g., methanol, cyclohexanol, propylene glycol and the like. The mineral acids and strong alkalis can be employed as solutions in water, whereas metal halide Lewis acid catalysts tend to decompose in water and aqueous solutions of such Lewis acids are not preferred.

In a preferred embodiment of the invention abrasive structures are prepared by first preparing the grindable, curable epoxy resin. To accomplish this polycarboxylic anhydride, e.g., maleic anhydride and a polyol, e.g., glycerol in a molar ratio of a 3 to 1 anhydride to polyol (i.e., 2 carboxy equivalents for each hydroxyl equivalent) are charged to a kettle fitted with an agitator and a thermometer and are heated to 100° C. The reaction is slightly exothermic but the temperature is maintained at about 100° C. with external cooling. If necessary further heat is applied to keep the temperature at about 100° C. for a period of from 1 to 3 hours. After this period dicyclopentadiene dioxide, 3 moles, i.e., one carboxy equivalent for each 3 epoxy equivalents, is added to the kettle. The temperature rises rapidly to about 125°. When the exotherm subsides the kettle contents are heated to about 155° C. for a time sufficient to give an epoxy resin having a capillary melting point of 65° to 95° C. and preferably from 75° to 85° C. The epoxy resin is then cooled and granulated. The granulated resin can be mixed at this point with a hardener, e.g., pyromellitic dianhydride if desired. Usually no more than one-half the theoretical amount of hardener to be added to cure the epoxy resin should be added unless the resin is to be used right away since the presence of more than this amount of hardener renders the resin unstable in storage. The granulated resin is ground to a fine powder, e.g., 98% through a 200 mesh screen prior to being used as the solid binder in the abrasive structure.

The wetting agent is prepared by mixing bis(2,3-epoxycyclopentyl)ether and a polyol, e.g., tetrahydrofurfuryl alcohol suitably in a weight ratio of 5 to 1.

The abrasive grains are typically aluminum oxide although any other abrasive grains, e.g., silicon carbide, natural corundum and diamonds can also be used in forming abrasive structures with this invention. About 2 to 6 weight percent and preferably 4 to 5 weight percent wetting agent is added to the abrasive grains and the theoretical amount of hardener, e.g., pyromellitic dianhydride is added to the mix, i.e., one-half mole per mole of bis(2,3-epoxycyclopentyl)ether. When the grains are thoroughly wet, from 6 to 12 weight percent and preferably from 7 to 9 weight percent of the powdered epoxy resin prepared above is mixed in with the wetted grains. The amount of hardener needed to bring the hardener content of the solid epoxy resin up to the theoretical, i.e., the molar amount required to react with unreacted epoxy groups, is added to the mixture suitably with from 10 to 15 weight percent of a filler such as cryolite.

The abrasive structure mixture can be cold pressed and cured or hot molded. With either molding method, abrasive structures having flexural strengths at room temperature and at elevated temperatures, e.g., 260° C., superior to phenolic resins are obtained.

To further describe and more clearly set forth the practice of the present invention, the following examples are presented. All parts and percentages are by weight.

Example 1

The grindable, curable epoxy resin was prepared by placing 20 parts maleic anhydride and 6 parts glycerol in a steam heated still at a temperature of 100° C. After an hour at this temperature, the mixture was cooled to 70° C. and 100 parts dicyclopentadiene dioxide was added. The temperature of the reaction mixture was raised over the course of an hour to 155° C. and held there until a Tripod Flow at 150° C. of 60 seconds was obtained. A 10 inch Hg vacuum was then applied intermittently and heating continued until a value of 70–75 seconds was reached. The resin was then cooled. Properties of the resin included:

| | |
|---|---|
| Epoxy assay | 210–265 |
| Tripod Flow rate at 150° C. | 70–75 |
| Contraction point ° C. | 65–75 |
| Ring and ball melting point ° F. | 170–195 |

This resin (834 parts) was coarse crushed through a Fitz Mill using a 2-B screen and blended with 146 parts pyromellitic dianhydride and 20 parts calcium silicate. The blend was put through a micronizing unit using 80–90 pounds/sq. inch air pressure and thereafter stored in closed containers below 70° F. Properties of the blend included:

| | |
|---|---|
| Plate flow at 125° C. | 18–22 mm. |
| Powder density | 21 g./cc. |
| Contraction point | 68–78° C. |
| Sieve analysis | 98.5% through 200 mesh screen. |

The liquid, curable resin was prepared by heating 84.75 parts bis(2,3-epoxycyclopentyl)ether to 70° C. until it became a clear liquid and then adding 15.25 parts tetrahydrofurfuryl alcohol. The mixture was then allowed to cool. The properties of the resin included:

| | |
|---|---|
| Specific gravity | 1.144–1.146 |
| Epoxy assay | 112–120 |
| Flash point, ° F., | [1] 240 |

[1] Cleveland open cup.

An abrasive composition was prepared by blending 260 grams each of #12 aluminum oxide, #14 aluminum oxide and #16 aluminum oxide grains together and adding 21 grams of a 5 to 1 mixture of the liquid curable resin prepared above. Twelve grams of pyromellitic dianhydride was added. To this blend was added 97 grams of cryolite mixed with 14 grams pyromellitic dianhydride and 76 grams of the powdered epoxy resin-pyromellitic dianhydride mixture prepared above which contained one-half the theoretical amount of pyromellitic dianhydride and 5 percent calcium silicate, based on the resin.

This abrasive composition was cold pressed into test bars 6″ by 1″ by ½″ having a density of 2.93 grams/cubic centimeter. The bars were cured on a twenty hour cycle with an initial temperature of 250° F. gradually increased to 365° F. for the final twelve hours.

Example 2

The grindable, curable epoxy resin was prepared by placing dicyclopentadiene dioxide, maleic anhydride and glycerol in a molar ratio of 3/1/0.33 in a kettle and heating to about 95° C. at which point an exothermic reaction set in. The mixture was cooled to maintain a gradual rise in temperature. When the exotherm had subsided, heat was again applied to bring the temperature gradually to 155° C. where it was maintained until the resin had a capillary melting point of 80° C. The resin was cooled, granulated and mixed with pyromellitic dianhydride as described in Example 1.

Test bars were again prepared following the technique of Example 1.

Example 3

The grindable, curable epoxy resin was prepared by placing 20 parts maleic anhydride and 6 parts trimethylolpropane in a steam heated still and heating at a temperature of 100° C. After an hour at this temperature, the mixture was cooled to 70° C. and 100 parts dicyclopentadiene dioxide was added. The temperature of the reaction mixture was raised over the course of an hour to 155° C. and held there until a Tripod Flow at 150° C. of 60 seconds was obtained. A 10 inch Hg vacuum was then applied intermittently and heating continued until a value of 70–75 seconds was reached. The resin was then cooled and pyromellitic dianhydride added as in Example 1.

Test bars were prepared as in Example 1.

Example 4

The grindable, curable epoxy resin was prepared by placing 20 parts maleic anhydride and 6 parts glycerol in a steam-heated still and heating at a temperature of 100° C. After an hour at this temperature, the mixture was cooled to 70° C. and 100 parts dicyclopentadiene dioxide was added. The temperature of the reaction mixture was raised over the course of an hour to 155° C. and held there until a Tripod Flow at 150° C. of 60 seconds was obtained. A 10 inch Hg vacuum was then applied intermittently and heating continued until a value of 70–75 seconds was reached. The resin was then cooled and 292 grams of pyromellitic dianhydride, the theoretical amount necessary to react with all the unreacted epoxy groups, was added.

Test bars were again prepared using the technique of Example 1.

The bars prepared in Examples 1–4 were tested for flexural strength by ASTM method D–790 at temperatures of 25° C. and 260° C. Modulus of elasticity was also determined. The results are given in Table 1. For comparison, a phenolic resin widely used as an abrasive binder was prepared and similarly tested. The test bars prepared from an all-phenolformaldehyde resin bonded abrasive composition used the same combination of abrasive grains and cryolite, but used as a wetting agent a liquid phenol-formaldehyde resin and as a solid, grindable phenol-formaldehyde resin. The liquid resin was prepared by reacting together a mole of phenol and a mole of para-formaldehyde and a catalytic amount of caustic soda. The solid resin was prepared by reacting a mole of phenol with 0.9 mole formaldehyde (37.5% aqueous solution) and a catalytic amount of oxalic acid. The resulting solid, brittle resin was ground with sufficient hardening agent (about 9–10%), hexamethylenetetramine, to make a heat-hardenable phenol-formaldehyde resin. Test bars from this abrasive composition were cured for 22 hours starting at 150° F. (66° C.), with a final holding of 12 hours at 365° F. (180° C.).

TABLE III

| Examples | Flexural Strength, p.s.i. | | Modulus of Elasticity×10⁶ | |
|---|---|---|---|---|
| | 25° C. | 260° C. | 25° C. | 260° C. |
| 1 | 7,083 | 4,056 | 3.47 | 1.50 |
| 2 | 5,150 | 2,260 | 3.08 | 0.98 |
| 3 | 5,541 | 2,873 | 2.55 | 1.15 |
| 4 | 5,706 | 2,895 | 2.90 | 1.21 |
| Phenolic | 3,500 | 1,000 | 2.47 | 0.23 |

It is evident that in every instance the epoxy bonded test bars exceeded the phenolic bonded bars in flexural strength both at 25° C. (room temperature) and at elevated temperatures of 260° C. The bars of Example 1 which were made according to the preferred form of the invention exceeded at 260° C. the flexural strength of the conventional phenolic resin at room temperature, which is a convincing demonstration of the vastly superior strengths our abrasive structures possess at elevated temperatures. It is noteworthy too that the epoxy bonded abrasive structures of Example 1 were more than twice as strong as phenolic bonded abrasive structures at 25° C. and at 260° C.

*Examples 5–7*

A grindable, curable epoxy resin was prepared by placing dicyclopentadiene dioxide, maleic anhydride and glycerol in a molar ratio of 3/1/0.33 in a kettle and heating to about 95° C. at which point an exothermic reaction set in. The mixture was cooled to maintain a gradual rise in temperature. When the exotherm had subsided, heat was again applied to bring the temperature gradually to 155° C. where it was maintained until the resin had a capillary melting point of about 80° C. The resin was cooled and pulverized.

A portion of the above-prepared resin was mixed with 5% calcium silicate and set aside as the solid, curable resin of Example 5.

A second portion of the resin was mixed with 5% calcium silicate and one-half the theoretical amount of pyromellitic dianhydride and set aside as the solid, curable resin of Example 6.

A third portion of the resin was mixed with 5% calcium silicate and the full theoretical amount of pyromellitic dianhydride and set aside as the solid, curable resin of Example 7.

A wetting agent was prepared by heating together 100 parts of 4-vinylcyclohexene dioxide and 7 parts glycerol until a homogeneous liquid was obtained.

Three abrasive compositions were prepared as in Example 1. The formulations (in grams) of these compositions are shown below.

| | Example | | |
|---|---|---|---|
| | 5 | 6 | 7 |
| Aluminum Oxide (#12, #14 & #16) | 780 | 780 | 780 |
| Wetting agent (4-vinylcyclohexene dioxide) | 21 | 21 | 21 |
| Hardener (pyromellitic dianhydride) | 15 | 15 | 15 |
| Filler (cryolite) | 97 | 97 | 97 |
| Hardener for Abrasive Composition (pyromellitic dianhydride) | 22 | 13 | |
| Solid, curable epoxy resin | 65 | 74 | 87 |

Test bars were prepared and tested as in Example 1. Results are given in Table IV below.

TABLE IV

| Examples | Flexural Strength, p.s.i. | | Modulus of Elasticity×10⁶ | |
|---|---|---|---|---|
| | 25° C. | 260° C. | 25° C. | 260° C. |
| 5 | 3,890 | 1,610 | 2.31 | 0.56 |
| 6 | 3,950 | 1,870 | 2.10 | 0.68 |
| 7 | 3,640 | 2,210 | 2.03 | 0.90 |

It is evident from a consideration of Table IV that somewhat better strengths are obtained at elevated temperatures when the theoretical amount of hardener (Example 7) is added during preparation of the resin. Such a resin, however, tends to be unstable unless it is stored at less than room temperature, whereas a resin to which is added during resin preparation up to one-half the theoretical amount (Example 6) is stable at room temperature and provides abrasive compositions nearly equal in strength at elevated temperatures to those prepared with the full theoretical amount of hardener. Where all of the hardener is added to the abrasive composition at the time of its preparation (Example 5) inferior strength is obtained, perhaps because of poorer distribution of the hardener in the abrasive composition mass.

*Example 8*

A solid, curable resin was prepared by reacting together 1.0 mole of dicyclopentadiene dioxide, 0.11 mole of glycerol and 0.2 mole maleic anhydride, by heating at 250° C. with stirring. The reaction was continued at 240–270° C. for approximately 30 minutes or until the resin was advanced to the point where it was a grindable solid when cooled to 25° C. The resin when cooled was coarse crushed and blended with 0.4 mole of pyromellitic dianhydride and the entire blend was micropulverized.

A liquid resin was prepared by heating together 3 moles dicyclopentadiene dioxide, 3–4 moles maleic anhydride and 0.33 mole of glycerol to a temperature of only about 70° C. A homogeneous mixture was obtained which was a low viscosity liquid at 25° C.

An abrasive composition was prepared by wetting 760 grams of a mixture of equal amounts of #12, #14 and #16 aluminum oxide grit with 35 grams of the liquid curable resin prepared above. The wetted grains were then mixed with 85 grams of the powdered resin prepared above and 120 grams of cryolite filler. Mixing was continued until each grain was coated with powder. The mix was then cold molded into six 6″ x 1″ x ½″ abrasive bars having a density of 2.9 grams/cc. This is a dense structure comparable to that of a snagging wheel used for billet grinding. The bars were placed in an oven at 365° F. and cured for 16 hours. After cooling, they were tested for flexural strength at 25° C. and 260° C. according to ASTM D-790. Flexural strength at 25° C. and 260° C. was 4700 pounds/sq. inch and 2200 pounds/sq. inch respectively.

*Example 9*

The procedure of Example 8 was followed except that the solid curable resin was prepared by reacting together dicyclopentadiene dioxide, maleic anhydride and glycerol and adding 0.8 mole of fumaric acid to the cooled mass rather than 0.4 mole of pyromellitic dianhydride. Flexural strength at 25° and 260° C. was 5100 and 1200 pounds/sq. inch respectively.

*Example 10*

The procedure of Example 9 was followed except that the solid curable resin was prepared by reacting together dicyclopentadiene dioxide, maleic anhydride and glycerol and adding itaconic acid to the cooled mass in place of fumaric acid. Flexural strength at 25° and 260° C. was 3300 and 1200 pounds/sq. inch respectively.

*Example 11*

The procedure of Example 9 was followed except that the solid curable resin was prepared by reacting together dicyclopentadiene dioxide, maleic anhydride and glycerol and adding pentaerythritol tetramaleate to the cooled mass in place of fumaric acid. Flexural strength at 25° and 260° C. was 4300 and 1000 pounds/sq. inch respectively.

*Example 12*

The procedure of Example 9 was followed except that the solid curable resin was prepared by reacting together dicyclopentadiene dioxide, glycerol and 40/60 styrene/maleic anhydride copolymer. Flexural strength at 25° and 260° C. was 4600 and 2200 pounds/sq. inch respectively. Endomethylenetetrahydrophthalic anhydride can also be used in place of styrene-maleic anhydride copolymer.

*Example 13*

The procedure of Example 9 was followed except that Nadic anhydride (registered trademark of National Aniline Company for the reaction product of one mole of maleic anhydride and one mole of cyclopentadiene) was used in place of the fumaric acid. Dicyclopentadiene dioxide, one third the theoretical amount of Nadic anhydride and glycerol were reacted together and the cooled mass blended with two-thirds the theoretical amount of Nadic anhydride. Flexural strength at 25° and 260° C. was 3200 and 1700 pounds/sq. inch respectively.

*Example 14*

The procedure of Example 9 was followed except that the solid curable resin was prepared by reacting together dicyclopentadiene dioxide and aconitic acid and no polyol. Flexural strength at 25° C. and 260° C. was 3200 and 1600 respectively.

*Example 15*

The procedure of Example 8 was followed except that succinic anhydride was used in place of the maleic anhydride. Dicyclopentadiene dioxide, one third the theoretical amount of succinic anhydride and glycerol were reacted together and the cooled mass blended with two-thirds the theoretical amount of succinic anhydride. Flexural strength at 25° and 260° C. was 3800 and 500 pounds/sq. inch respectively.

*Example 16*

The procedure of Example 8 was followed except that phthalic anhydride was used rather than maleic anhydride. Flexural strength at 25° and 260° C. was 4400 and 1100 pounds/sq. inch respectively.

*Example 17*

The procedure of Example 8 was followed except that the molar ratio of the dicyclopentadiene dioxide, maleic anhydride and glycerol was changed to 1/1/0.11. Flexural strength at 25° and 260° C. was 5300 and 4400 pounds/sq. inch respectively.

It will be noted this method, adding the full amount of anhydride at the time of preparing the resin, provides the greatest strengths, probably due to the better mixing achieved in this method. The resins thus prepared should be used promptly, however, as they age in storage.

Results of Examples 8–16 are summarized in Table V, and compared with a typical phenolic resin as described in Example 1 above.

TABLE V

| Resin | | Flexural Strength (pounds/sq. inch) | |
|---|---|---|---|
| Solid Phenolic Epoxy of— | Liquid Phenolic Epoxy of— | 25° C. | 260° C. |
| | | 3,800 | 1,000 |
| Example 8 | Example 8 | 4,700 | 2,200 |
| Example 9 | Example 8 | 5,100 | 1,200 |
| Example 10 | Example 8 | 3,300 | 1,200 |
| Example 11 | Example 8 | 4,300 | 1,000 |
| Example 12 | Example 8 | 4,600 | 2,200 |
| Example 13 | Example 8 | 3,200 | 1,700 |
| Example 14 | Example 8 | 3,200 | 1,600 |
| Example 15 | Example 8 | 3,800 | 500 |
| Example 16 | Example 8 | 4,400 | 1,100 |
| Example 17 | Example 8 | 5,300 | 4,400 |

What is claimed is:

1. An abrasive composition comprising abrasive grains wetted with a liquid, curable epoxy resin composition comprising a polycarboxylic acid anhydride and a member selected from the group consisting of 4-vinylcyclohexene dioxide, bis(2,3-epoxycyclopentyl)ether and dicyclopentadiene dioxide, and a powdered solid, curable epoxy resin of a polycarboxylic acid anhydride and dicyclopentadiene dioxide.

2. An abrasive composition comprising abrasive grains wetted with a liquid, curable epoxy resin of 4-vinylcyclohexene dioxide, a polycarboxylic acid anhydride and a polyol in such relative amounts as to provide about 0.1 to 0.8 carboxy equivalent of the anhydride and up to 2.0 hydroxyl equivalents of the polyol for each epoxy equivalent of 4-vinylcyclohexene dioxide, and a powdered solid, curable epoxy resin of dicyclopentadiene dioxide, a polycarboxylic acid anhydride and a polyol in such relative amounts as to provide about 0.16 to 5.0 carboxy equivalents of the anhydride and up to 2.0 hydroxy equivalents of the polyol for each epoxy equivalent of dicyclopentadiene dioxide.

3. An abrasive composition comprising abrasive grains wetted with a liquid, curable epoxy resin of bis(2,3-epoxycyclopentyl)ether, a polycarboxylic acid anhydride and a polyol in such relative amounts as to provide about 0.33 to 4.0 carboxy equivalents of the anhydride and up to 2.0 hydroxyl equivalents of the polyol for each epoxy equivalent of bis(2,3-epoxycyclopentyl)ether and a powdered solid, curable epoxy resin of dicyclopentadiene dioxide, a polycarboxylic acid anhydride and a polyol in such relative amounts as to provide about 0.16 to 5.0 carboxy equivalents of the anhydride and up to 2.0 hydroxyl equivalents of the polyol for each epoxy equivalent of dicyclopentadiene dioxide.

4. An abrasive composition comprising abrasive grains wetted with a liquid, curable epoxy resin of dicyclopentadiene dioxide, a polycarboxylic acid anhydride and a polyol in such relative amounts as to provide about 0.16 to 5.0 carboxy equivalents of the anhydride and up to 2.0 hydroxyl equivalents of the polyol for each epoxy equivalent of dicyclopentadiene dioxide and a powdered solid, curable epoxy resin of dicyclopentadiene dioxide, a polycarboxylic acid anhydride and a polyol in such relative amounts as to provide about 0.16 to 5.0 carboxy equivalents of the anhydride and up to 2.0 hydroxyl equivalents of the polyol for each epoxy equivalent of dicyclopentadiene dioxide.

5. The abrasive composition claimed in claim 2 wherein the polycarboxylic acid anhydride and the polyol of the solid, curable epoxy resin are maleic anhydride and glycerol respectively.

6. The abrasive composition claimed in claim 3 wherein the polycarboxylic acid anhydride and the polyol of the solid, curable epoxy resin are maleic anhydride and glycerol respectively.

7. The abrasive composition claimed in claim 4 wherein the polycarboxylic acid anhydride and the polyol of the solid, curable epoxy resin are maleic anhydride and glycerol respectively.

8. The abrasive composition claimed in claim 5 wherein the solid epoxy resin is of dicyclopentadiene dioxide, maleic anhydride and glycerol in a molar ratio of about 3/1/0.33.

9. The abrasive composition claimed in claim 6 wherein the solid epoxy resin is of dicyclopentadiene dioxide, maleic anhydride and glycerol in a molar ratio of about 3/1/0.33.

10. The abrasive composition claimed in claim 7 wherein the solid epoxy resin is of dicyclopentadiene dioxide, maleic anhydride and glycerol in a molar ratio of about 3/1/0.33.

11. An abrasive structure comprising abrasive grains bonded with a cured epoxy resin composition comprising a polycarboxylic acid anhydride, a polyol and a member selected from the group consisting of dicyclopentadiene dioxide, 4-vinylcyclohexene dioxide, and bis(2,3-epoxycyclopentyl)ether and a cured epoxy resin of a polycarboxylic acid anhydride, a polyol and dicyclopentadiene dioxide.

12. An abrasive structure comprising abrasive grains bonded with a cured epoxy resin of bis(2,3-epoxycyclopentyl)ether, a polycarboxylic acid anhydride and a polyol in such relative amounts as to provide about 0.67 to 3.00 carboxy equivalents of the anhydride and 0.16 to 1.67 hydroxyl equivalents for each epoxy equivalent of the bis(2,3-epoxycyclopentyl)ether and a cured epoxy resin of dicyclopentadiene dioxide, maleic anhydride and glycerol in a molar ratio of 3/1/0.33.

13. An abrasive structure comprising abrasive grains bonded with a cured epoxy resin of dicyclopentadiene dioxide, maleic anhydride and glycerol in a molar ratio of about 1/1/0.33 and a cured epoxy resin of dicyclopentadiene dioxide, maleic anhydride and glycerol in a molar ratio of about 1/1/0.11.

14. An abrasive structure comprising abrasive grains bonded with a cured epoxy resin of dicyclopentadiene dioxide, succinic anhydride and glycerol in a molar ratio of about 1/1/0.33 and a cured epoxy resin of dicyclopentadiene dioxide, succinic anhydride and glycerol in a molar ratio of about 1/1/0.11.

15. Method of preparing abrasive structures comprising wetting abrasive grains with a liquid, curable epoxy resin composition comprising a polycarboxylic acid anhydride, a polyol and a member selected from the group consisting of 4-vinylcyclohexene dioxide, bis(2,3-epoxycyclopentyl)ether and dicyclopentadiene dioxide, mixing the so-wetted grains with a powdered, curable epoxy resin of a polycarboxylic acid anhydride, a polyol and dicyclopentadiene dioxide, and molding and curing the resulting mixture.

16. Method of preparing abrasive structures comprising wetting abrasive grains with a liquid, curable epoxy resin composition comprising a polycarboxylic acid anhydride, a polyol and bis(2,3-epoxycyclopentyl)ether, mixing the so-wetted grains with a powdered, curable epoxy resin of dicyclopentadiene dioxide, maleic anhydride and glycerol in a molar ratio of about 3/1/0.33 and molding and curing the mixture.

17. Method of preparing abrasive structures comprising wetting abrasive grains with a liquid, curable epoxy resin composition comprising bis(2,3-epoxycyclopentyl)ether, pyromellitic dianhydride and tetrahydrofurfuryl alcohol, mixing the so-wetted abrasive grains with a powdered, curable epoxy resin of dicyclopentadiene dioxide, maleic anhydride and glycerol in a molar ratio of about 3/1/0.33 and curing the mixture.

References Cited by the Examiner

UNITED STATES PATENTS

| | | | |
|---|---|---|---|
| 2,008,723 | 7/1935 | Mills | 51—298 |
| 2,559,665 | 7/1951 | Ries et al. | 51—298 |
| 2,824,851 | 2/1958 | Hall | 51—298 XR |
| 2,862,806 | 12/1958 | Nestor | 51—298 |
| 2,890,197 | 6/1959 | Phillips et al. | 260—45.4 |
| 2,948,688 | 8/1960 | Bender et al. | 260—2 |
| 2,962,469 | 11/1960 | Phillips et al. | 51—298 XR |
| 3,000,848 | 9/1961 | McGary et al. | 260 |

FOREIGN PATENTS 738,232 10/1955 Great Britain.

ALFRED L. LEAVITT, *Primary Examiner.*

JOSEPH REBOLD, JOHN R. SPECK, MORRIS LIEBMAN, ALEXANDER H. BRODMERKEL, *Examiners.*